(12) United States Patent
Griswold

(10) Patent No.: US 7,482,061 B2
(45) Date of Patent: Jan. 27, 2009

(54) CHROMIUM FREE CORROSION RESISTANT SURFACE TREATMENTS USING SILICONIZED BARRIER COATINGS

(75) Inventor: Roy Melvin Griswold, Ballston Spa, NY (US)

(73) Assignee: Momentive Performance Materials Inc., Albany, NY (US)

( * ) Notice: Subject to any disclaimer, the term of this patent is extended or adjusted under 35 U.S.C. 154(b) by 287 days.

(21) Appl. No.: 11/063,005

(22) Filed: Feb. 22, 2005

(65) Prior Publication Data
US 2006/0115657 A1    Jun. 1, 2006

Related U.S. Application Data

(60) Provisional application No. 60/631,698, filed on Nov. 30, 2004.

(51) Int. Cl.
C08L 83/04    (2006.01)
B32B 9/04    (2006.01)

(52) U.S. Cl. .................... 428/447; 525/477

(58) Field of Classification Search ............ None
See application file for complete search history.

(56) References Cited

U.S. PATENT DOCUMENTS

| | | | |
|---|---|---|---|
| 3,186,967 A * | 6/1965 | Nitzsche et al. ............... 528/21 |
| 4,064,154 A | 12/1977 | Chandra et al. | |
| 4,584,355 A * | 4/1986 | Blizzard et al. ............. 525/477 |
| 4,655,767 A * | 4/1987 | Woodard et al. ............ 424/448 |
| 4,781,988 A | 11/1988 | Rusek et al. ................ 428/450 |
| 5,455,080 A | 10/1995 | van Ooij ..................... 427/470 |
| 5,498,481 A | 3/1996 | van Ooij ..................... 428/413 |
| 5,519,104 A * | 5/1996 | Lucas .......................... 528/18 |
| 6,180,117 B1 | 1/2001 | Berthiaume et al. | |
| 6,534,184 B2 * | 3/2003 | Knasiak et al. ............. 428/447 |
| 6,652,978 B2 | 11/2003 | Lukacs, III et al. | |
| 2003/0083453 A1 | 5/2003 | Lukacs, III et al. | |
| 2004/0086718 A1 | 5/2004 | Pawlik et al. ............... 428/413 |
| 2005/0020733 A1 | 1/2005 | Pawlik et al. ............... 523/400 |

* cited by examiner

Primary Examiner—Marc S Zimmer
(74) Attorney, Agent, or Firm—Dominick G. Vicari

(57) ABSTRACT

The present invention provides for a curable composition comprising the reaction product of a silanol terminated silicone resin, a silanol terminated siloxane polymer and a silazane. The present invention also provides for the cured composition resulting from the curable composition and articles coated with the composition. The compositions of the present invention are corrosion resistant barrier coatings that are substantially chromium free.

20 Claims, No Drawings

CHROMIUM FREE CORROSION RESISTANT SURFACE TREATMENTS USING SILICONIZED BARRIER COATINGS

CROSS REFERENCE TO RELATED APPLICATIONS

This application claims the benefit of U.S. Provisional Application Ser. No. 60/631,698, filed Nov. 30, 2004.

OF THE INVENTION

The field of the present invention involves barrier coatings to prevent corrosion of the substrate onto which the coating has been applied. Application of the coating to the substrate produces a laminate comprising the substrate and the coating wherein the laminate is more resistant to corrosion by various chemical agents than the uncoated and therefore untreated substrate.

BACKGROUND OF THE INVENTION

Protective coatings are of two types. Protective coatings consist of either conversion coatings or barrier type coatings. Conversion coatings involve a chemical reaction that modifies a substrate surface. Typical conversion coatings utilize chromate treatments on metals or alloys such as aluminum, steel, and galvanized steel. Metal surfaces are normally coated from an aqueous solution that contains hexavalent or trivalent chromium ions, phosphate ions and/or fluoride ions. There is an increased environmental concern over the use of chromate (chromium) anti-corrosion treatments because of the leaching of toxic chromium salts into the environment.

A conversion coating typically modifies the composition or microstructure of the surface of the substrate by means of a chemical reaction or treatment. Such treatments usually result in producing a modification to the surface morphology. Examples include pack cementation and slurry cementation, specifically chromating and aluminizing. These techniques utilize diffusion to produce a surface coating that diffuses into the substrate. Thus a composition gradient exists between the surface of the treated substrate and the interior.

Other techniques involve the use of protective ceramic coatings or coatings of organic resins. Coatings comprised of organic resins typically function as barrier coatings. Barrier type coatings overlay a substrate and protect it from erosion; corrosion and in some cases strengthen a substrate. Despite considerable efforts these have not provided the equivalent corrosion resistance that chromate or aluminized based coatings provide.

SUMMARY OF THE INVENTION

The present invention provides for a curable coating composition comprising a reaction mixture said reaction mixture comprising the reaction product of:

a) a silicone resin having the formula:

$$M_a D_b T_c Q_d,$$

where
$M=R^1 R^2 R^3 SiO_{1/2}$;
$D=R^4 R^5 SiO_{2/2}$;
$T=R^6 SiO_{3/2}$; and
$Q=SiO_{4/2}$ where the subscripts a, b, c, and d are zero or positive and are chosen so that the resin has a viscosity, based on a 50 wt % solids solution in an aromatic solvent, varying between about 5 centistokes and 10,000 centistokes where each $R^1$, $R^2$, $R^3$, $R^4$, $R^5$ and $R^6$ is independently selected from the group of hydrogen, hydroxyl, C1 to C60 monovalent alkyl radicals; C1 to C60 monovalent halo-alkyl radicals; C1 to C60 monovalent aryl radicals; C1 to C60 monovalent halo-aryl radicals; C1 to C60 monovalent alkylaryl radicals; and C1 to C60 monovalent halo-alkylaryl radicals, subject to the limitation that at least one of $R^1$, $R^2$, and $R^3$ is hydroxyl;

b) a siloxane polymer having the formula:

$$M_e D_f T_g$$

where
$M=R^7 R^8 R^9 SiO_{1/2}$;
$D=R^{10} R^{11} SiO_{2/2}$;
$T=R^{12} SiO_{3/2}$; and where the subscripts e, f, and g are zero or positive and are chosen so that the resin has a viscosity varying between about 10 centistokes and 2,000,000 centistokes where each $R^7$, $R^8$, $R^9$, $R^{10}$, $R^{11}$ and $R^{12}$ is independently selected from the group of hydrogen, hydroxyl, C1 to C60 monovalent alkyl radicals; C1 to C60 monovalent halo-alkyl radicals; C1 to C60 monovalent aryl radicals; C1 to C60 monovalent halo-aryl radicals; C1 to C60 monovalent alkylaryl radicals; and C1 to C60 monovalent halo-alkylaryl radicals, subject to the limitation that at least one of $R^7$, $R^8$, and $R^9$ is hydroxyl; and c) a silazane having the formula:

$$M'_k D'_l T'_m Q'_n$$

where
$M'=R^{13} R^{14} R^{15} Si(NH)_{1/2}$;
$D'=R^{16} R^{17} Si(NH)_{2/2}$;
$T'=R^{18} Si(NH)_{3/2}$; and
$Q'=Si(NH)_{4/2}$ where the subscripts k, l, m, and n are zero or positive subject to the limitation that when l, m and n are zero k is two or greater and when one of l, m and n is not zero the sum of all the subscripts k, l, m and n is three or greater, where each $R^{13}$, $R^{14}$, $R^{15}$, $R^{16}$, $R^{17}$ and $R^{18}$ is independently selected from the group of C1 to C60 monovalent alkyl radicals; C2 to C60 monovalent alkenyl radicals; C1 to C60 monovalent halo-alkyl radicals; C2 to C60 monovalent halo-alkenyl radicals; C1 to C60 monovalent aryl radicals; C1 to C60 monovalent halo-aryl radicals; C1 to C60 monovalent alkylaryl radicals; C2 to C60 monovalent alkenylaryl radicals; C1 to C60 monovalent halo-alkylaryl radicals; and C2 to C60 monovalent halo-alkenylaryl radicals wherein said silazane is present in an amount wherein the silazane groups initially present due to said silazane are present in excess of stoichiometric relative to the amount of hydroxyl groups initially present due to said silicone polymer and said silicone resin by a factor of at least 1.25;

whereby the ammonia produced as a by-product of the reaction is removed from the reaction mixture. The present invention further provides for a cured composition obtained by curing a curable composition of the present invention. The present invention additionally provides for corrosion resistant barrier coatings that are substantially chromium free. Thus the present invention provides for articles coated with the compositions of the present invention as well as articles coated with the cured composition of the present invention.

DETAILED DESCRIPTION OF THE INVENTION

The present invention provides for a protective coating that improves the corrosion resistance of the substrate to which it is applied. When the coating is applied to the substrate in a sufficiently uniform fashion, the process of coating creates laminates comprising the coating and the substrate.

The present invention provides for a curable composition comprising the reaction product of:

a) a silicone resin having the formula:

$$M_a D_b T_c Q_d$$

where
$M = R^1 R^2 R^3 SiO_{1/2}$;
$D = R^4 R^5 SiO_{2/2}$;
$T = R^6 SiO_{3/2}$; and
$Q = SiO_{4/2}$ where the subscripts a, b, c, and d are zero or positive and are chosen so that the resin has a viscosity based on a 50 wt % solids solution in an aromatic solvent, varying between about 5 centistokes and 10,000 centistokes; preferably between about 5 centistokes and 5,000 centistokes; more preferably between about 10 centistokes and 3,000 centistokes; and most preferably between about 10 centistokes and 1,500 centistokes, where each $R^1$, $R^2$, $R^3$, $R^4$, $R^5$ and $R^6$ is independently selected from the group of hydrogen, hydroxyl, C1 to C60 monovalent alkyl radicals; C1 to C60 monovalent halo-alkyl radicals; C1 to C60 monovalent aryl radicals; C1 to C60 monovalent halo-aryl radicals; C1 to C60 monovalent alkylaryl radicals; and C1 to C60 monovalent halo-alkylaryl radicals, subject to the limitation that at least one of $R^1$, $R^2$, and $R^3$ is hydroxyl;

b) a siloxane polymer having the formula:

$$M_e D_f T_g$$

where
$M = R^7 R^8 R^9 SiO_{1/2}$;
$D = R^{10} R^{11} SiO_{2/2}$;
$T = R^{12} SiO_{3/2}$; and where the subscripts e, f, and g are zero or positive and are chosen so that the resin has a viscosity varying between about 10 centistokes and 2,000,000 centistokes; preferably between about 25 centistokes and 2,000,000 centistokes; more preferably between about 25 centistokes and 1,000,000 centistokes; and most preferably between about 50 centistokes and 1,000,000 centistokes, where each $R^7$, $R^8$, $R^9$, $R^{10}$, $R^{11}$ and $R^{12}$ is independently selected from the group of hydrogen, hydroxyl, C1 to C60 monovalent alkyl radicals; C1 to C60 monovalent halo-alkyl radicals; C1 to C60 monovalent aryl radicals; C1 to C60 monovalent halo-aryl radicals; C1 to C60 monovalent alkylaryl radicals; and C1 to C60 monovalent halo-alkylaryl radicals, subject to the limitation that at least one of $R^7$, $R^8$, and $R^9$ is hydroxyl;

c) a silazane having the formula:

$$M'_k D'_l T'_m Q'_n$$

where
$M' = R^{13} R^{14} R^{15} Si(NH)_{1/2}$;
$D' = R^{16} R^{17} Si(NH)_{2/2}$;
$T' = R^{18} Si(NH)_{3/2}$; and
$Q' = Si(NH)_{4/2}$ where the subscripts k, l, m, and n are zero or positive subject to the limitation that when l, m and n are zero k is two or greater and when one of l, m and n is not zero the sum of all the subscripts k, l, m and n is three or greater, where each $R^{13}$, $R^{14}$, $R^{15}$, $R^{16}$, $R^{17}$ and $R^{18}$ is independently selected from the group of C1 to C60 monovalent alkyl radicals; C2 to C60 monovalent alkenyl radicals; C1 to C60 monovalent halo-alkyl radicals; C2 to C60 monovalent halo-alkenyl radicals; C1 to C60 monovalent aryl radicals; C1 to C60 monovalent halo-aryl radicals; C1 to C60 monovalent alkylaryl radicals; C2 to C60 monovalent alkenylaryl radicals; C1 to C60 monovalent halo-alkylaryl radicals; and C2 to C60 monovalent halo-alkenylaryl radicals;

d) a curing catalyst; and
e) optionally a solvent.

The present invention also provides for the cured composition resulting from the curable composition.

The silicone resin, component a), is present in the curable formulation in an amount ranging from slightly more than 0 to about 50 percent by weight, preferably in an amount ranging from slightly more 0 to about 45 percent by weight, more preferably in an amount ranging from about 10 to about 45 percent by weight, and most preferably in an amount ranging from about 20 to about 40 percent by weight.

The siloxane or silicone polymer, component b), is present as a fluid or gum, in the curable formulation in an amount ranging from about 0.5 to about 15 percent by weight, preferably in an amount ranging from about 1 to about 15 percent by weight, more preferably in an amount ranging from about 5 to about 15 percent by weight, and most preferably in an amount ranging from about 5 to about 10 percent by weight.

The silazane, component c), is present in the curable formulation in an amount ranging from about 5 to about 30 percent by weight, preferably in an amount ranging from about 5 to about 25 percent by weight, more preferably in an amount ranging from about 10 to about 25 percent by weight, and most preferably in an amount ranging from about 15 to about 25 percent by weight. The amount of silazane initially present in the reaction mixture must be present in an equivalent molar or stoichiometric excess relative to the total quantity (or sum) of silanol hydroxyl groups provided by component a), the silicone resin, and b), the silicone fluid or gum. Thus the phrase "an equivalent molar or stoichiometric excess" of silazane relative to the total amount of silanol hydroxyl groups means that the number of divalent NH radicals in a silazane molecule supplied to the reaction mixture in the silazane component, component c), must exceed the total number of silanol hydroxyl groups in the silicone resin and the silicone polymer supplied to the reaction mixture as components a) and b). The molar equivalent or stoichiometric excess of silazane required varies from about a factor of at least 1.25 to about a factor of 60.00, preferably from about 1.50 to about 50.00, more preferably from about 1.75 to about 40.00, and most preferably from about 2.00 to about 30.00.

Subject to the foregoing molar or stoichiometric requirements of having divalent NH radicals in excess, the silazane, component c), may be substituted by siloxazane compounds having the formula:

$$M_o M'_p D_q D'_r T_s T'_t Q_u Q'_v$$

where the definitions of M, M', D, D', T, T', Q, and Q' are as previously specified and the subscripts o, p, q, r, s, t, u and v are zero or positive subject to the limitation that the sum of o, p, q, r, s, t, u, and v is at least three and the sum of p, r, t and v is at least one.

It is to be noted that when dealing with molecular species the stoichiometric subscripts defined in the foregoing formulas will be zero or positive integers. When dealing with mixtures of compounds that individually satisfy the foregoing formulas, the stoichiometric subscripts will either be zero or a stoichiometrically averaged non-zero positive number. The limitations placed on the subscripts apply to both pure compounds and mixtures.

The curing catalyst, component d), is present in the curable formulation in an amount ranging from about 0 to about 500 parts per million based on solids, preferably in an amount ranging from about 0 to about 300 parts per million based on solids, more preferably in an amount ranging from about 20 to about 200 parts per million based on solids, and most preferably in an amount ranging from about 20 to about 100 parts per million based on solids. The catalyst may be any one of several known condensation catalysts that promote silanol condensation and is preferably selected from the group consisting of a carboxylic acid salt of zinc, titanium, tin, zirconium, or a combination thereof, such as for example zinc 2-ethylhexanoate, zinc octoate, a titanate ester such as tetraisopropyltitanate, tetrabutyltitanate, dibutyltin dilaurate, dimethyltin dineodecanoate, dibutyltin dioctoate, dimethyltin oxide, dimethylhydroxytin oleate, dibutyltin bis(acetylacetonate), and zirconium 2-ethylhexanoate. Especially preferred is dibutyl tin dilaurate.

The solvent, component e), is present in the curable formulation in an amount ranging from about 25 to about 90 percent by weight, preferably in an amount ranging from about 35 to about 90 percent by weight, more preferably in an amount ranging from about 50 to about 90 percent by weight, and most preferably in an amount ranging from about 50 to about 80 percent by weight. The solvent may be any solvent suitable to simultaneously dissolve components a), b), c) and e) without reaction and is preferably selected from the group of solvents consisting of paraffinic hydrocarbons including linear, branched and cyclic hydrocarbons, aromatic hydrocarbons, aromatic hydrocarbons substituted with linear and/or branched alkyl groups, and volatile linear and/or cyclic siloxanes.

The coating compositions of the present invention are prepared by reacting components a), b) and c) either neat or diluted by an appropriate solvent, component e), at a temperature ranging from about 25 to 150° C., preferably from about 25 to 125° C., more preferably from about 25 to 100° C., and most preferably from about 25 to 80° C., under conditions where the by-product ammonia released as a consequence of the reaction is removed from the reaction mixture preferably by sparging with a non-reactive gas such as nitrogen, helium, argon and the like to prevent unwanted side reactions. Once the reaction product of components a), b) and c) has been prepared it can be stored in the absence of moisture until it is intended to be used. Alternatively the reaction product of components a), b) and c) can be mixed with the curing catalyst, component d), coated onto a metal substrate and cured. Typically the curing reaction proceeds most conveniently if it is accelerated by the application of heat.

The curable coating compositions of the present invention and the cured compositions of the present invention provide for barrier coatings that are substantially free of chromium.

As used herein the phrase substantially free of chromium means the compositions of the present invention when cured possess less than about 0.1 weight percent chromium, preferably less than about 0.01 weight percent chromium, more preferably less than about 0.001 weight percent chromium, and most preferably less than about 0.0001 weight percent chromium. Ideally the presence of any chromium is so minimal as to be undetectable.

The following examples are merely illustrative of the invention, serving to illustrate only some of the features of the present invention. The appended claims are intended to claim the invention as broadly as it has been conceived and the examples herein presented are illustrative of selected embodiments from a manifold of all possible embodiments. Accordingly it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims. All United States patents referenced herein are herewith and hereby specifically incorporated by reference.

EXPERIMENTAL

Example 1

Samples were blended in the weight ratios shown in Table 1 in 5 grams toluene then agitated for 1-2 hours. In this table, $M^{OH}$ is dimethylhydroxylsiloxy, D refers to dimethylsiloxy, T is methylsiloxy, and T' is phenylsiloxy groups. The silazanes are products available from [1]KiON Corporation. One-gram samples were removed and placed in aluminum pans followed by curing as also noted in Table 1. Each sample was visually examined qualitatively for flexibility, hardness and abrasion resistance as determined by finger nail abrating. This example illustrates a resinous coating cured at above room temperatures provides a resinous coating. The coating composition may be comprised of a silanol fluid or silanol functional resin.

TABLE 1

| Silazane | Fluid/Gum | Silazane/fluid wt/wt ratio | Cure Temp | Observation (s) |
|---|---|---|---|---|
| ML33/C33 | $M^{OH}D_{5-10}M^{OH}$ | 1 g/4 g | air, room temp | Soft Coating, Abrates |
|  |  |  | 150° C., 2 hrs | Soft Coating, Abrates |
|  |  |  | 250° C., 2 hrs | Abrasion Resistant |
| ML33/C33 | $M^{OH}D_{5-10}M^{OH}$ | 4 g/1 g | air, room temp | Resinous Abrates |
|  |  |  | 150° C., 2 hrs | Soft Coating, Abrates |
|  |  |  | 250° C., 2 hrs | Soft Coating, Abrates |
| S | $M^{OH}D_{5-10}M^{OH}$ | 1 g/4 g | air, room temp | oily, no cure |
|  |  |  | 150° C., 2 hrs | oily, no cure |
|  |  |  | 250° C., 2 hrs | Flexible, |

TABLE 1-continued

| Silazane | Fluid/Gum | Silazane/fluid wt/wt ratio | Cure Temp | Observation (s) |
|---|---|---|---|---|
| S | $M^{OH}D_{5-10}M^{OH}$ | 4 g/1 g | air, room temp | Abrasion Resistant Resinous, Soft Coating |
| | | | 150° C., 2 hrs | Flexible, Abrasion Resistant |
| | | | 250° C., 2 hrs | Abrasion Resistant |
| VL20 | $M^{OH}D_{5-10}M^{OH}$ | 1 g/4 g | air, room temp | Soft Coating, Abrates |
| | | | 150° C., 2 hrs | Flexible Coating |
| | | | 250° C., 2 hrs | Resinous Coating |
| VL20 | $M^{OH}D_{5-10}M^{OH}$ | 4 g/1 g | air, room temp | Soft Coating, Abrates |
| | | | 150° C., 2 hrs | Flexible Coating |
| | | | 250° C., 2 hrs | Resinous Coating |
| ML33/C33 | $M^{OH}T_{47.5}T'_{47.5}D_5M^{OH}$ | 4 g/1 g | air, room temp | Soft coating, Abrates |
| | | | 150° C., 2 hrs | Flexible, Abrates |
| | | | 250° C., 2 hrs | Hard, Abrasion Resistant, but not Flexible |
| VL20 | $M^{OH}T_{47.5}T'_{47.5}D_5M^{OH}$ | 4 g/1 g | air, room temp | Resinous, Soft Coating |
| | | | 150° C., 2 hrs | Flexible, Abrasion Resistant |
| | | | 250° C., 2 hrs | Hard, Abrasion Resistant, but not Flexible |

Example 3

To a 250 ml Erlenmeyer flask equipped with a nitrogen purge and stirrer by a magnetic stirrer was added toluene, resin and fluid. The $M^{OH}$, D, T and T' are defined as in example 1. To this solution was added [1]KiON VL20 silazane at room temperature. Agitation and nitrogen sparging continued until no ammonia odor detected. Metal panels were flow coated then cured as noted in Table 2. These panels (duplicates) were placed in 5 wt % sodium chloride solution to determine anti-corrosion properties. Each panel was examined after 24 hours for coating adhesion failure, pin-hole generation. Control resin-fluid composition without reaction with a silazane failed the sodium chloride evaluation with total removal of the coating from both aluminum and steel substrates. This example illustrates compositions comprised of a silicone resin and fluid reacted with a silazane as an effective barrier coating.

TABLE 2

| Resin/Fluid, gum | Silazane/Resin-Fluid wt/wt ratio | Toluene wt % | Cure Time/Temperature | Observation (s) |
|---|---|---|---|---|
| $M^{OH}T_{47.5}T'_{47.5}D_5M^{OH}$ + $M^{OH}D_{5-10}M^{OH}$ | 4.2/10/0.3 | 61 | 30 minutes/150° C. | Aluminum panels; Abrasion Resistant coating; Passed NaCl solution soak |
| $M^{OH}T_9D_{91}M^{OH}$ + $M^{OH}D_{-350}M^{OH}$ + $MD_{-150}M$ | 5.8/4.5/0.09/0.006 | 73 | 60 minutes/150° C. | Steel panels, Abrasion Resistant coating; Passed NaCl solution soak |

Example 3

Into a 1 liter Morton flask was introduced 481.6 g toluene, 150.5 g of a $M^{OH}T_{60}T'_{35}D_5M^{OH}$ resin where he $M^{OH}$, D, T and T' are defined as in example 1, 0.7 g of a polydimethylmethylphenylsiloxane gum containing 14 mole % phenyl equipped with agitation condenser and nitrogen sparing. The mixture was heated to 60° C. until the gum had dissolved then 67.2 g of [1]KiON VL20 was rapidly added and heating continued at 60-70° C. for two hours while removing ammonia via nitrogen sparing. The reaction mixture was cooled to room temperature then 0.2 g dibutyltin dilaurate was added.

The above composition was flow coated to give an average 7 microns dry film thickness on HDG panels (4 inch×12 inch G70 hot dipped galvanized steel) supplied by ACT Laboratories. Two sets of panels were cleaned only (HCC-hard coat, cleaned using Betz Kleen 132 at ~3% volume/volume, 130 deg F., followed by a 15 second spray at 20 psi pressure, rinsing with tap water for 5 seconds, rinse with deionized water for 3 seconds, followed by drying by forced cool air) and had been pretreated with GE Betz PT 2000 at 1.0 mg/ft² Ti (HCCT-hard coat, cleaned using Betz Kleen 132 at ~3% volume/volume, 130 deg F., followed by a 15 second spray at 20 psi pressure, rinsing with tap water for 5 seconds, rinse with deionized water for 3 seconds, then Betz Permatreat 2000 at 10% volume/volume, 130 deg F., pH 3.8-4.0, 5 sec. spray at 20 psi to generate ~1.0 mg/sqft Ti coating, rinsing with tap water 5 seconds, followed by drying by forced cool air). The coated panels were tested in accordance with NSS and QCT against commercial coatings of GE Betz PT 2510 and Procoat 9857/9858 (The controls for this study were typical chromium based passivation products. Permatreat 2510 is a conventional thin Cr passivation with coating weights targeted to be ~1.0 mg/sqft as Cr. Betz ProCoat 9857/ProCoat 9858 chrome acrylic passivation, used to enhance the appearance, lubricity, corrosion resistance and fingerprint resistance of zinc containing steel sheet. Coating weights are targeted to be 2.0-4.0 mg/sqft as Cr.)

Testing

NSS testing stands for Neutral Salt Spray testing. This is an accelerated corrosion tested described by ASTM B117. Panels are continuously exposed to a fog of 5% NaCl solution, and temperature is held at 100 deg. F. Panels are rated on various performance criteria. For this test, the percentages of rust observed at given intervals of exposure are reported. For hot dipped galvanized, initial rust of the zinc surface is white (% WR). After corrosion breaks through the zinc layer, the steel layer corrodes as a red color (% RR).

QCT testing is a condensing humidity test. Panels are exposed to warm, humid air (140 deg F., 100% humidity) on one side, and cool ambient temperatures on the other, causing water to condense on the surface. This test also rates percentages of white and red rust.

TABLE 3

| NSS Testing | % WR/% RR | | | |
|---|---|---|---|---|
| ID | 144 hr. | 168 hr. | 216 hr. | 312 hr. |
| PT 2510 | 100/5 | 100/10 | Discontinued test | Discontinued test |
| PT 2510 | 100/1 | 100/5 | Discontinued test | Discontinued test |
| Procoat 57/58 | 15 | 50 | 90 | 100/5 |
| Procoat 57/58 | 3 | 5 | 15 | 40 |
| HCC | 1 | 1 | 3 | 5 |
| HCC | 0 | 0 | 1 | 2 |
| HCCT | 5 | 5 | 15 | 40 |
| HCCT | 5 | 10 | 20 | 60 |

TABLE 4

| QCT Testing | % WR | |
|---|---|---|
| ID | 144 hr. | 168 hr. |
| PT 2510 | 50 | 50 |
| PT 2510 | 50 | 75 |
| Procoat 57/58 | 0 | 0 |
| Procoat 57/58 | 0 | 0 |
| HCC | 1 | 1 |
| HCC | 1 | 1 |
| HCCT | 0 | 0 |
| HCCT | 0 | 0 |

[1]KiON Corporation

Having described the invention that which is claimed is:

1. A moisture curable coating composition comprising a reaction mixture said reaction mixture comprising:
   a) a silicone resin in the amount of 10 to 45 percent by weight based on the total weight of the composition and having the formula:

$M_a D_b T_c Q_d$, where
   $M=R^1 R^2 R^3 SiO_{1/2}$;
   $D=R^4 R^5 SiO_{2/2}$;
   $T=R^6 SiO_{3/2}$; and
   $Q=SiO_{4/2}$
   where the subscripts a is positive b, c, and d are zero or positive and are chosen so that the resin has a viscosity, based on a 50 percent by weight solids solution in an aromatic solvent, varying between about 5 centistokes and 10,000 centistokes where each $R^1$ is independently selected from the group of hydrogen, hydroxyl, and monovalent alkyl, haloalkyl, aryl, halo-aryl, alkylaryl and halo-alkylaryl containing from 1 to 60 carbon atoms, each $R^2$, $R^2$, $R^4$, $R^5$ and $R^6$ is selected from the group of hydrogen and monovalent alkyl, haloalkyl, aryl, halo-aryl, alkylaryl and halo-alkylaryl containing from 1 to 60 carbon atoms , subject to the limitations that at least one of $R^1$ is hydroxyl and the subscripts c and d cannot both be zero;

b) a siloxane polymer in the amount 0.5 to 15 percent by weight based on the total weight of the composition and having the formula:

$M_e D_f T_g$ where
   $M=R^7 R^8 R^9 SiO_{1/2}$;
   $D=R^{10} R^{11} SiO_{2/2}$;
   $T=R^{12} SiO_{3/2}$; and
   where the subscripts e and f are positive, g is zero, and e, f and g are chosen so that the polymer has a viscosity varying between about 10 centistokes and 2,000,000 centistokes where each $R^7$ is independently selected from the group of hydrogen, hydroxyl, and monovalent alkyl, haloalkyl, aryl, halo-aryl, alkylaryl and halo-alkylaryl radicals containing from 1 to 60 carbon atoms, $R^8$, $R^9$, $R^{10}$, $R^{11}$ and $R^{12}$ is independently selected from the group of hydrogen, and monovalent alkyl, haloalkyl, aryl, halo-aryl, alkylaryl and halo-alkylaryl radicals containing from 1 to 60 carbon atoms, subject to the limitation that at least one of $R^7$ is hydroxyl;

c) a silazane in the amount of 5 to 30 percent by weight based on the total weight of the composition and having the formula:

$M'_k D'_l T'_m Q'_n$ where
   $M'=R^{13} R^{14} R^{15} Si(NH)_{1/2}$;
   $D'=R^{16} R^{17} Si(NH)_{2/2}$;
   $T'=R^{18} Si(NH)_{3/2}$; and
   $Q'=Si(NH)_{4/2}$
   where the subscripts k, l, m and n are zero or positive, where each $R^{13}$, $R^{14}$, $R^{15}$, $R^{16}$, $R^{17}$ and $R^{18}$ is independently selected from the group of monovalent alkyl, alkenyl, halo-alkyl, halo-alkenyl, aryl, halo-aryl, alkylaryl, alkenylaryl, halo-alkylaryl, and halo-alkenylaryl radicals containing from 1 to 60 carbon atoms, subject to the limitations that the sum of k, l, m and n is 3 or greater and said silazane is present in an amount wherein the silazane groups initially present due to said silazane are present in excess of stoichiometric relative to the amount of hydroxyl groups initially present due to said silicone polymer and said silicone resin by a factor of 2 to 30; and d) a curing catalyst in the amount of 0.002 to 0.02 percent by weight based on the total weight of the composition;
   whereby the ammonia produced as a by-product of the reaction is removed from the reaction mixture.

2. The composition of claim 1 wherein the silicone resin is present in an amount ranging from 20 to about 40 percent by weight based on the total weight of the composition.

3. The composition of claim 1 wherein the siloxane polymer is present in an amount ranging from about 5 to about 10 percent by weight based on the total weight of the composition.

4. The composition of claim 1 wherein the silazane is present in an amount ranging from about 15 to about 25 percent by weight based on the total weight of the composition.

5. The composition of claim 1 wherein the curing catalyst is present in an amount ranging from about 0.002 to about 0.01 percent by weight based on the total weight of the composition.

6. The composition of claim 2 wherein the siloxane polymer is present in an amount ranging from about 5 to about 10 percent by weight based on the total weight of the composition.

7. The composition of claim 2 wherein the silazane is present in an amount ranging from 15 to about 25 percent by weight based on the total weight of the composition.

8. The composition of claim 2 wherein the curing catalyst is present in an amount ranging from about 0.002 to about 0.01 percent by weight based on the total weight of the composition.

9. The composition of claim 1 additionally comprising a solvent.

10. An article coated with the composition of claim 1.

11. A cured coating composition comprising the reaction product of:

a) a silicone resin in the amount of 10 to 45 percent by weight based on the total weight of the composition and having the formula:

$$M_a D_b T_c Q_d,$$

where
$M=R^1 R^2 R^3 SiO_{1/2}$;
$D=R^4 R^5 SiO_{2/2}$;
$T=R^6 SiO_{3/2}$; and
$Q=SiO_{4/2}$ where the subscripts a is positive, b, c, and d are zero or positive and are chosen so that the resin has a viscosity, based on a 50 percent by weight solids solution in an aromatic solvent, varying between about 5 centistokes and 10,000 centistokes where each $R^1$ is independently selected from the group of hydrogen, hydroxyl, and monovalent alkyl, halo-alkyl, aryl, halo-aryl, alkylaryl, and halo-alkylaryl, containing from 1 to 60 carbon atoms, each $R^2$, $R^3$, $R^4$, $R^5$ and $R^6$ is selected from the group of hydrogen, hydroxyl, and monovalent alkyl, haloalkyl, aryl, halo-aryl, alkylaryl and halo-alkylaryl containing from 1 to 60 carbon atoms, subject to the limitations that at least one of $R^1$ is hydroxyl and the subscripts c and d cannot both be zero;

b) a siloxane polymer in the amount 0.5 to 15 percent by weight based on the total weight of the composition and having the formula:

$$M_e D_f T_g$$

where
$M=R^7 R^8 R^9 SiO_{1/2}$;
$D=R^{10} R^{11} SiO_{2/2}$;
$T=R^{12} SiO_{3/2}$; and where the subscripts e and f are positive, g is zero, and e, f and g are chosen so that the polymer has a viscosity varying between about 10 centistokes and 2,000,000 centistokes where each $R^7$ is independently selected from the group of hydrogen, hydroxyl, and monovalent alkyl, halo-alkyl, alkenyl, halo-alkenyl, aryl, halo-aryl, alkylaryl, halo-alkylaryl, alkenylaryl and halo-alkenylaryl radicals containing from 1 to 60 carbon atoms, each $R^8$, $R^9$, $R^{10}$, $R^{11}$ and $R^{12}$ is independently selected from the group of hydrogen, and monovalent alkyl, halo-alkyl, alkenyl, halo-alkenyl, aryl, halo-aryl, alkylaryl, halo-alkylaryl, alkenylaryl and halo-alkenylaryl radicals containing from 1 to 60 carbon atoms, subject to the limitation that at least one of $R^7$ is hydroxyl; and c) a silazane in the amount of 5 to 30 percent by weight based on the total weight of the composition and having the formula:

$$M'_k D'_l T'_m Q'_n$$

where
$M'=R^{13} R^{14} R^{15} Si(NH)_{1/2}$;
$D'=R^{16} R^{17} Si(NH)_{2/2}$;
$T'=R^{18} Si(NH)_{3/2}$; and
$Q'=Si(NH)_{4/2}$ where the subscripts k, l, m and n are zero or positive, where each $R^{13}$, $R^{14}$, $R^{15}$, $R^{16}$, $R^{17}$ and $R^{18}$ is independently selected from the group of monovalent alkyl, halo-alkyl, alkenyl, halo-alkenyl, aryl, halo-aryl, alkylaryl, halo-alkylaryl, alkenylaryl, and halo-alkenylaryl radicals containing from 1 to 60 carbon atoms, subject to the limitations that the sum of k, l, m and n is 3 or greater and said silazane is present in an amount wherein the silazane groups initially present due to said silazane are present in excess of stoichiometric relative to the amount of hydroxyl groups initially present due to said silicone polymer and said silicone resin by a factor of 2 to 30; and d) a curing catalyst in the amount of 0.002 to 0.02 percent by weight based on the total weight of the composition; whereby the ammonia produced as a by-product of the reaction is removed from the reaction mixture.

12. The composition of claim 11 wherein the silicone resin is present in an amount ranging from 20 to about 40 percent by weight based on the total weight of the composition.

13. The composition of claim 11 wherein the siloxane polymer is present in an amount ranging from about 5 to about 10 percent by weight based on the total weight of the composition.

14. The composition of claim 11 wherein the silazane is present in an amount ranging from about 15 to about 25 percent by weight based on the total weight of the composition.

15. The composition of claim 11 wherein the curing catalyst is present in an amount ranging from about 0.002 to about 0.01 percent by weight based on the total weight of the composition.

16. The composition of claim 12 wherein the siloxane polymer is present in an amount ranging from about 5 to about 15 percent by weight based on the total weight of the composition.

17. The composition of claim 12 wherein the silazane is present in an amount ranging from 10 to about 25 percent by weight based on the total weight of the composition.

18. The composition of claim 12 wherein the curing catalyst is present in an amount ranging from about 0.002 to about 0.01 percent by weight based on the total weight of the composition.

19. The composition of claim 11 additionally comprising a solvent.

20. An article coated with the composition of claim 11.

* * * * *